United States Patent
Damodaran et al.

(10) Patent No.: US 10,649,884 B2
(45) Date of Patent: May 12, 2020

(54) METHODS AND SYSTEM FOR CONSTRAINED REPLAY DEBUGGING WITH MESSAGE COMMUNICATIONS

(71) Applicant: The MITRE Corporation, McLean, VA (US)

(72) Inventors: Suresh K. Damodaran, Acton, MA (US); Brendan T. Sileo, Amherst, NH (US); Alexander J. Padin, Nashua, NH (US); Caroline Lee, Somerville, MA (US)

(73) Assignee: The MITRE Corporation, McLean, VA (US)

( * ) Notice: Subject to any disclaimer, the term of this patent is extended or adjusted under 35 U.S.C. 154(b) by 207 days.

(21) Appl. No.: 15/892,200

(22) Filed: Feb. 8, 2018

(65) Prior Publication Data

US 2019/0243746 A1    Aug. 8, 2019

(51) Int. Cl.
*G06F 11/00* (2006.01)
*G06F 11/36* (2006.01)
*G06F 3/0481* (2013.01)

(52) U.S. Cl.
CPC ...... *G06F 11/3636* (2013.01); *G06F 3/04817* (2013.01); *G06F 11/3664* (2013.01)

(58) Field of Classification Search
CPC .......................... G06F 11/3636; G06F 11/3664
USPC ...................................................... 715/772
See application file for complete search history.

(56) References Cited

U.S. PATENT DOCUMENTS

| | | |
|---|---|---|
| 6,275,956 B1 | 8/2001 | On et al. |
| 8,504,994 B2 | 8/2013 | Golender et al. |
| 8,826,242 B2 | 9/2014 | Livshits et al. |
| 8,972,945 B2 | 3/2015 | Bates |
| 9,658,943 B2 | 5/2017 | Gounares |

(Continued)

FOREIGN PATENT DOCUMENTS

WO    2016/124230    8/2016

OTHER PUBLICATIONS

Allinea DDT User Guide (2012) Allinea DDT, Allinea Software Version 3.2.1-27702, retrieved from http://www.scc.kit.edu/scc/docs/HP-XC/ddt/userguide_3.2.1.pdf; 139 pages.

(Continued)

*Primary Examiner* — Katherine Lin
(74) *Attorney, Agent, or Firm* — Morrison & Foerster LLP

(57) ABSTRACT

A graphical user interface configured to facilitate replay debugging in distributed software programs is provided. In one or more examples, the graphical user interface provides a visual progress bar, wherein a position on the visual progress bar corresponds to a log file generated when the distributed software program is executed. The user can manipulate the graphical user to replay the log files and visualize the state of the playback through the visual progress bar. The graphical user interface can also allow the user to provide watch points and can allow the user to visualize variables that are contained within the log files. The watch points can represent one or more conditions. The log files can be analyzed to determine if they meet the condition specified in the watch point, and if the log files meet the condition, a visual indication can be provided on the visual progress bar.

30 Claims, 7 Drawing Sheets

(56) References Cited

U.S. PATENT DOCUMENTS

2003/0028858 A1 2/2003 Hines
2014/0366006 A1 12/2014 Gottschlich et al.
2017/0013289 A1* 1/2017 Nightingale ..... H04N 21/23113

OTHER PUBLICATIONS

The Distributed Debugging Tool User Guide v1.10, (2006) User Guide Allinea, retrieved from http://icc.dur.ac.uk/Computing/DDT/userguide.pdf; 100 pages.
Yang, Chaoyu (2015) "Easier Spark Code Debugging Real-Time Progress Bar and Apache Spark's web UI Integration in Databricks," Company Blog, Databricks, retrieved from https://databricks.com/blog/2015/09/23/easier-spark-code-debugging-real-time-progress-bar-and-apache-spark-web-ui-integration-in-databricks.html; 3 pages.

* cited by examiner

METHODS AND SYSTEM FOR CONSTRAINED REPLAY DEBUGGING WITH MESSAGE COMMUNICATIONS

FIELD OF THE INVENTION

This disclosure relates to systems and methods for analyzing and debugging distributed or multi-threaded events by replaying traces of message communication execution logs. These systems and methods can employ a visual progress bar that allows for a programmer and/or software developer to review event logs to diagnose and debug program code that is executed over a distributed or multi-threaded computing environment.

BACKGROUND OF THE INVENTION

In the field of computer science, distributed systems have been utilized to allow for faster and more efficient execution of program code that can often prove overly cumbersome and computationally complex for a single stand-alone system to effectively process. A distributed system can refer to a computing mode in which multiple networked computers "work together" by communicating and coordinating their actions to achieve a single result. In the context of computing, distributed systems consisting of multiple computers can work together to execute a single program, thereby spreading the computational burdens across the multiple computers so as to not overly burden any single computer.

The multiple computing resources organized in a distributed system can communicate and coordinate their actions by passing along messages to one another. In an example where multiple computers work together to execute a single program, each computer can perform one or more tasks associated with execution of the program, and can pass messages to another computer in the distributed system, wherein the message can contain information required by the receiver to execute their task within the program.

While distributed systems allow for faster computing speeds by breaking a program down into parts and spreading the computational burden across multiple computers, the process of developing distributed software applications can be difficult because if there is an error in the code, the source of the error may be difficult to ascertain since multiple machines are each running different portions of the overall program and access to the code that each machine is running individually may not be possible or can be cumbersome to debug.

Debugging programs used to debug distributed software often attempt to identify errors in the source code of the software run by each distributed component by employing a sequential debugger for software in each component. Some distributed system software debuggers focus on the communication s between components in the distributed system. These debugging programs, known as replay debuggers, can focus on the communication events between components of the distributed system to detect unintended conditions among the messages or various faults, each of which can provide clues as to the source of the program code error.

Replay debuggers can characterized as belonging to one of two categories: Replay debuggers that replay the execution of the distributed code in its entirety; and replay debuggers wherein only just the messages communicated between components of the distributed system are replayed.

In replay debuggers in which only the messages communicated between components of the distributed are replayed, there has been a long-felt need by programmers to have the ability to focus the replay debugging to a subset of messages either manually or through programmable constraints. Since the execution of a single distributed software program can generated numerous messages between components, providing the developer the ability to focus only on a subset of the messages can be a valuable resource in debugging code.

SUMMARY OF THE INVENTION

Accordingly, systems and methods for constrained replay debugging with message communications are provided. In one example, a user-interface for a replay debugger can employ a visual progress bar that allows of a programmer or developer to visually see the progress of messages being generated by the various components of a distributed system. By able to visually inspect the messages in an organized fashion that is facilitated by the visual progress bar, a programmer or developer can more efficiently diagnose and debug problems encountered with the execution of their code.

In one or more examples, in conjunction with the visual progress bar, the replay debugger can be configured to allow for the developer to manually constrain the messages appearing in the visual progress bar so that only a selected subset of the messages appear. In one or more examples the visual progress bar can be configured to support replay-debugging during real-time execution with the ability to save a subset of the message logs created based on criteria selected by the user of the replay debugger. Additionally, and in one or more examples, the visual bar can be configured to provide a visual display of watch-point evaluation results, and additionally or in one or more examples, the visual progress bar can be configured to provide an automate replay debug boundary setting based on user-programmable constraints.

The systems and methods described above can be used by programmers or software developers to visually inspect messages between components during execution of distributed software for the purpose of debugging or other contexts in which viewing the messages generated between components in a distributed system can prove useful.

DETAILED DESCRIPTION OF THE INVENTION

Figure 1:
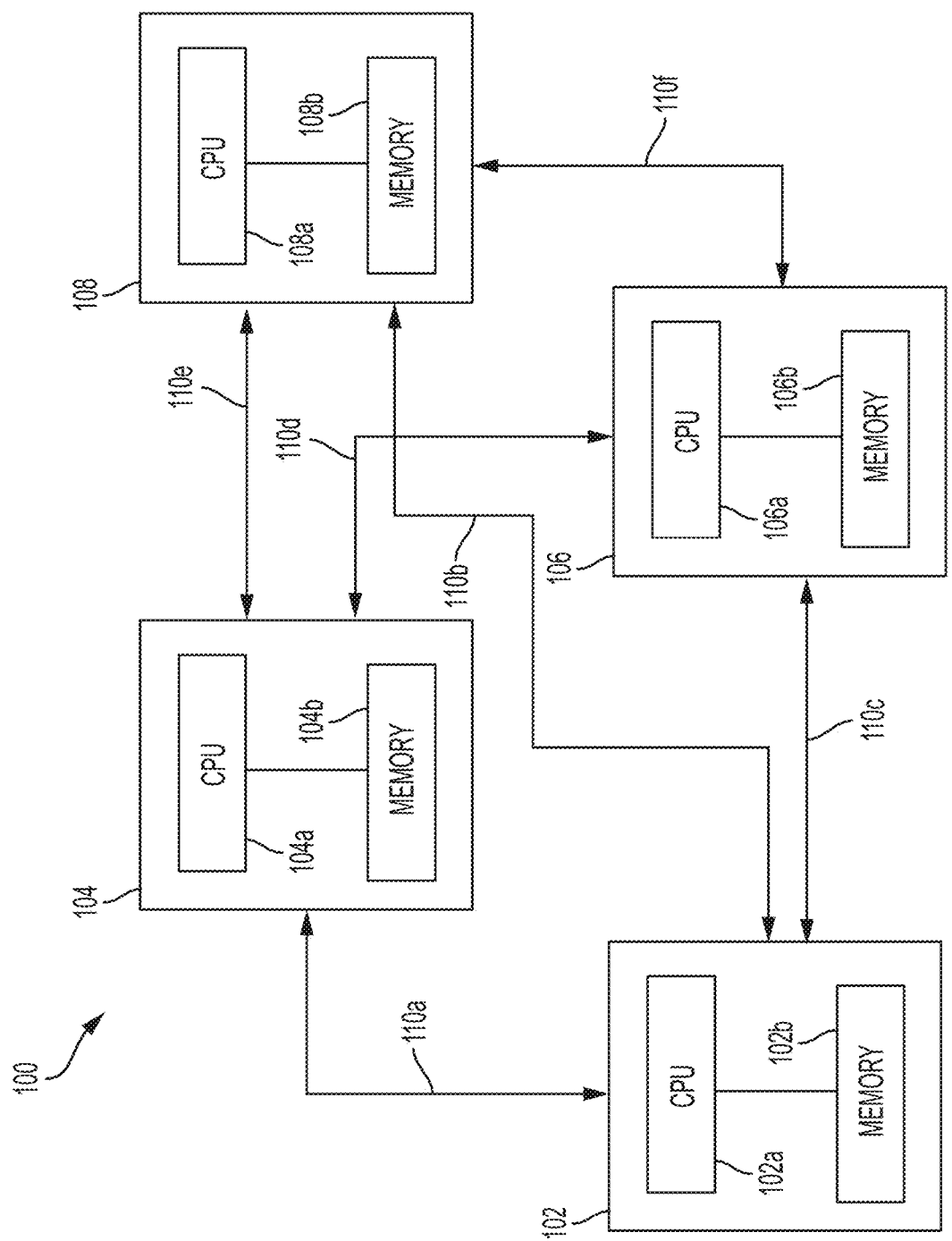
FIG. 1 illustrates an exemplary distributed computing system configured to execute a distributed software program according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for visualizing and replaying messages generated between computing elements in a distributed computing system that is executing a distributed software. In one example, the system can provide a user the ability to visualize the various messages associated with the execution of distributed software by providing a visual progress bar that supports the visualization of the chronological progress of messages generated during execution of the distributed software program. The visual progress bar can also be configured to allow for a user of the system to pause the replay, inspect individual messages generated during the execution of the program, track the changes of individual variables associated with the execution of the program, and step through the execution of the distributed program step-by-step at the pace desired by a user of the system.

FIG. 1 illustrates an exemplary distributed computing system configured to execute a distributed software program according to examples of the disclosure. The example of FIG. 1 illustrates a distributed computing system 100 that includes a plurality of computing elements 102, 104, 106, and 108. Each computing element 102, 104, 106, and 108 can include both a processor 102a, 104a, 106a, and 108a and a memory 102b, 104b, 106b, and 108b respectively. The processor and memory of each computing element can be utilized to execute a distributed software program, in which portions of the overall program are executed individually by each computing element. The computing elements can coordinate their various actions by passing messages to one another that indicate the status of variables or other information needed by a component to carry out its portion of the distributed program.

In one or more examples, each computing element 102, 104, 106 and 108 can be communicatively coupled to one another via communication channels 110a-f. In one or more examples communications through communications channel 110a-f can be implemented using Wifi, Bluetooth, Ethernet, or any other type of communications channel known in the art to connect two or more computing devices. In one or more examples, each computing element can be connected to every other computing element that is part of the distributed system. Alternatively, each computing element may be connected to only a subset of the computing elements that form the distributed computing system.

Figure 2:
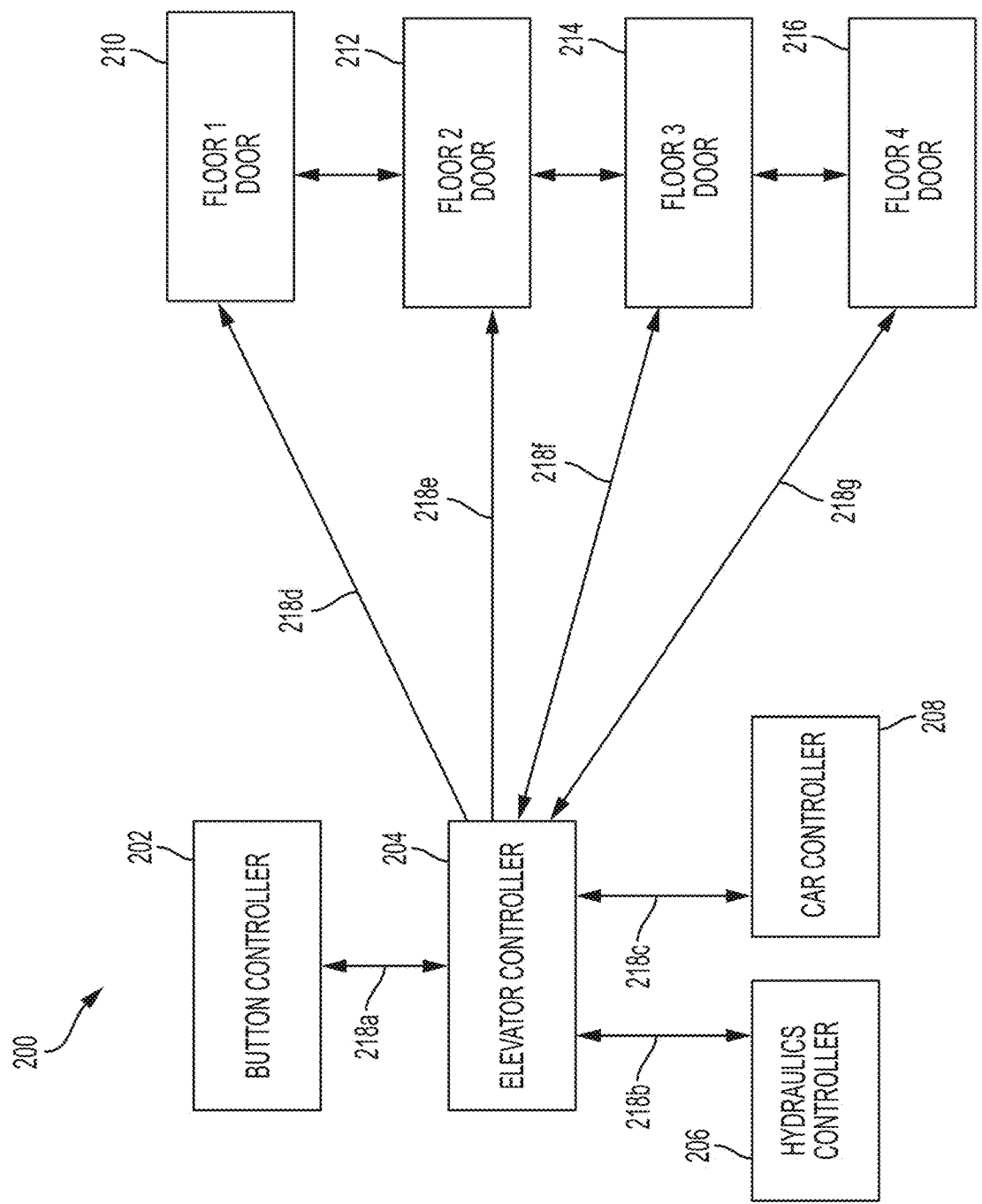
FIG. 2 illustrates an exemplary cyber-physical system that can utilize a distributed computing architecture according to examples of the disclosure.

Distributed computing systems can be utilized to coordinate the activities of multiple computing elements to execute a common task. For instance a cyber-physical system can be implemented using a distributed computing environment. Cyber-physical systems can refer to systems that include physical entities and mechanisms that are controlled and monitored by computer-based processes. FIG. 2 illustrates an exemplary cyber-physical system that can utilize a distributed computing architecture according to examples of the disclosure. The system 200 described with respect to FIG. 2 can be implemented in an elevator system that transports people and/or objects from one floor of a building to another floor of a building. The system 200 can include a plurality of components 202, 204, 206, 208, 210, 212, and 214 that can be used by the elevator system to facilitate the transport of individuals from one floor of a building to another.

Button controller 202 can represent the processor and memory associated with the buttons of the elevator that are manipulated by a user of the elevator to control which floor/floors the elevator goes to. Elevator controller 204 can represent the processor and memory that can act as the central computing element of the distributed system 200 that can coordinate the activities of each of the other elements attached to it. For instance, elevator controller 204 can be communicatively coupled to hydraulics controller 206 that coordinates the hydraulic components of the elevator system, the car controller 208 that controls the elevator car, and door processors 210, 212, 214, and 216 which control the individual doors of each floor of the building (in this example, the building has 4 floors).

Similar to the system described with respect to FIG. 1, the individual components of the system 200 can coordinate their activities with respect to executing a distributed software program by passing messages to one another via communications channels 218*a-g*. The distributed software program being executed by system 200 can be configured to allow each of the individual components of the system to work together to execute on the common goal of facilitation the operation of the elevator for ordinary use.

The elevator system 200 can act as an example of a cyber-physical system that utilizes a distributed computing architecture. When a software developer is developing distrusted software such as the one used to operate the system 200, any errors in the code used to execute the system may be difficult to diagnose and remedy because the code used to implement the system may reside on multiple components of the system. In the example of system 200, if the elevator is not operating correctly due to a bug in the software used to run the system, a developer may encounter difficulty in locating where the bug is in the code because portions of the code reside on different devices.

In light of this difficulty, software developers have often turned to replay debuggers to aid in the process of diagnosing and fixing errors in the software that are encountered during the development process. As the name implies, replay debugging can involve the execution of a software program that is "recorded" and then played back in a controlled manner to allow a software developer to step through the execution of a software program to pinpoint errors in execution. In the context of a distributed computing system that can execute a distributed software program, a replay debugger can utilize the messages that are generated by components of the distributed system and passed between them to aid the developer in diagnosing errors in distributed software. A replay debugger can operate by collecting all of the messages generated during the operation of distributed software program, and present them to the developer so that the developer can sort through them to determine the root cause of an error.

However, the process of the sorting through messages generated during the execution of a distributed software program can be cumbersome since many systems that employ a distributed computing environment can produce copious amounts of messages that are often not presented to the user in an organized manner that is meaningful to the developer. The process of sifting through the messages passed between components in a distributed system can be cumbersome and inefficient. Often times the user of a replay debugger does not want to inspect each and every message associated with the execution of the distributed software but would rather see a subset of those messages, wherein the subset is defined by the user's own constraints.

Furthermore, due to the large number of messages that can be generated during the execution of a distributed software program, simply providing messages for a user to inspect during the debugging process may not be meaningful if the user does not have a method to visualize the chronology and generation of the messages over time and ascertain how various values associated with the execution of the program changes over time.

Figure 3:
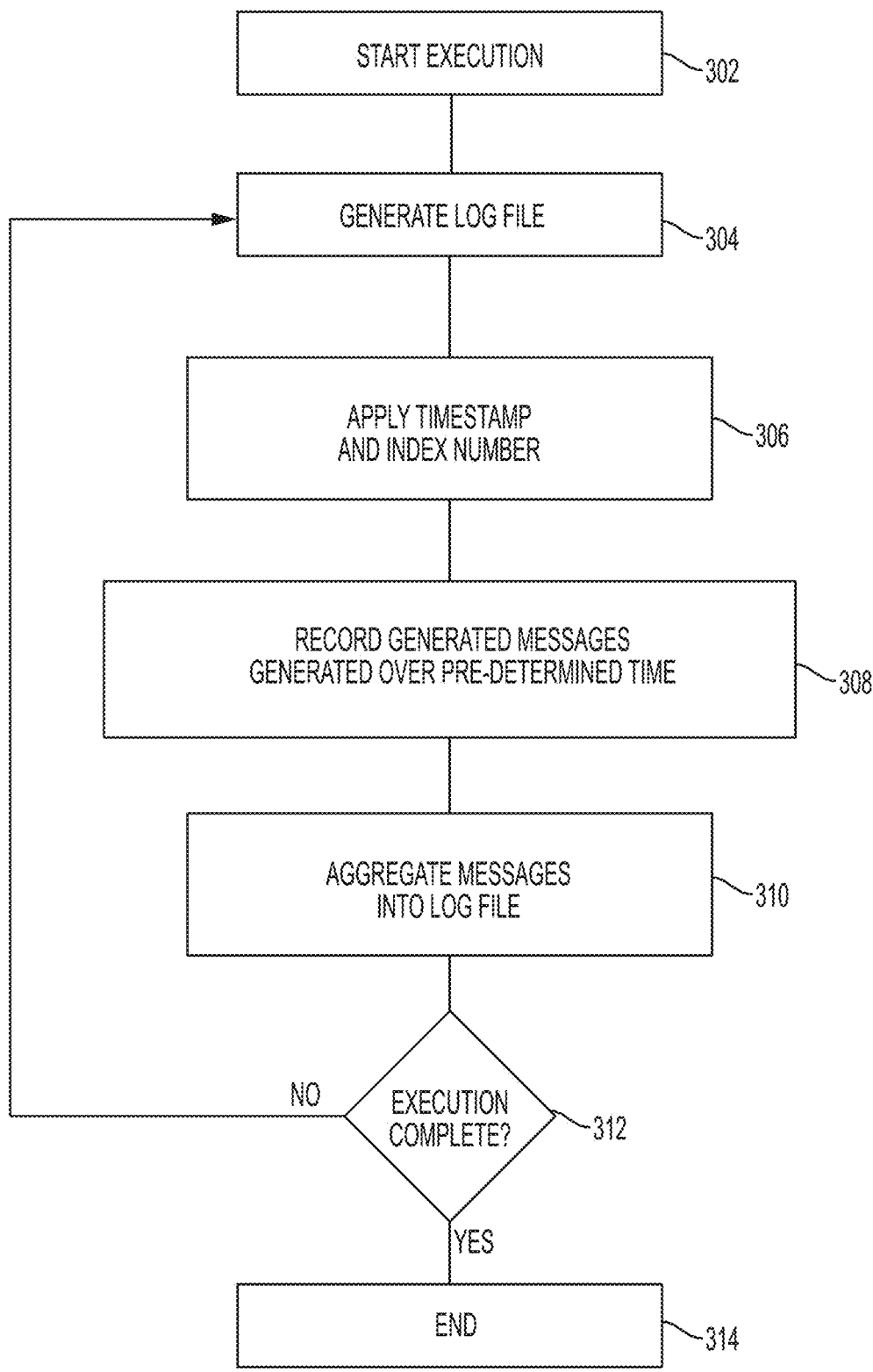
FIG. 3 illustrates an exemplary process for collecting and aggregating messages associated with the execution of a distributed software program according to examples of the disclosure.

A graphical user interface that can be configured to allow the user to constrain the messages used for debugging and present the messages to the user in a format and visual presentation that can facilitate efficient debugging can greatly reduce the amount of time required to engage in the replay debugging of a distributed software program. FIG. 3 illustrates an exemplary graphical user interface for a replay debugger according to examples of the disclosure.

In order to configure a graphical user interface to operate with the above described features, the data generated from the messages during execution of the distributed software program can be collected and organized so as to facilitate the user of the replay debugger's interacting with the graphical user interface.

FIG. 3 illustrates an exemplary process for collecting and aggregating messages associated with the execution of a distributed software program according to examples of the disclosure. The process 300 can be configured to organize the messages generated during execution of a distributed software program into a plurality of logs that are organized in a manner that facilitates operation of a graphical user interface that can make the replay debugging process more efficient.

The process 300 can begin at step 302 wherein execution of a distributed software program is started. As discussed above, a distributed software program can be executed over multiple computing elements. In one or more examples, at step 302, a portion of the distributed software program can be executed according to a user's specification. Using the example of the elevator provided above, the distributed software program associated with operation of the elevator system and its components can be operated beginning with a specific operation such as a user calling the elevator. In other words, step 302 can represent the beginning of a simulation that tests the operation of the distributed software program used to run the elevator.

Once the execution of the software or simulation is started at step 302, the process 300 can move to step 304 wherein a log file is initially created. As will be described further below, a log file can be ingested by the graphical user interface of the replay debugger and used to provide information to the user of the replay debugger about the messages generated during the operation of the software.

Once the initial log file is created at step 304, the process can move to step 306, wherein a timestamp and an index number can be written into the log file. Since the execution of a distributed software program can be spread over multiple separate computing elements, there generally is not a master clock or common clock between the components that can be utilized as a frame of reference to understand the time relationships between various messages passed between components of the distributed computing system. Thus, at step 306, once a log file has been generated by the replay debugger, the generated log file can have a timestamp written into the file by the replay debugger. In one example, the replay debugger can establish time zero to be at step 302 wherein execution of the distributed software program under inspection is begun, and can stamp the log file generated at step 304 with the time that has elapsed since the execution of step 302. For example, if 20 seconds has passed since step 302 was executed and the log file was created at step 304, the replay debugger can write simulation time=20 seconds within the generated log file.

In addition to writing a time stamp at 306, the replay debugger can also write an index number to the generated log file. The rate at which messages are generated during the execution of a distributed software program may exceed the resolution of the simulation time clock. For instance is the simulation time is kept at a resolution of 1 second but multiple log files are generated during that one second (i.e., for instance if log files are generated every millisecond), than the index number can be used by the replay debugger to keep track of the chronological order of the log files within a given time frame. For instance if 74 different log files are generated during the twentieth second of the software execution, then each of the log files can be written with a an index number one through seventy four indicating the order in which the logs were generated during the twentieth second. In one more examples, the generated log file can have a timestamp written to it as described above, or have an index number written to it as described above, or both.

Once the timestamp and/or index number has been written to the generated log file at step 306, the process 300 can move to step 308 wherein messages generated over a pre-determined time are recorded. As described above, during operation of a distributed software program, a plurality of message can be generated by each of the components of the distributed computing system and transmitted to other components with the distributed computing system. At step 308, the messages generated during the execution of the distributed computing system can be recorded, i.e. stored in a memory. The messages can be recorded over a pre-determined amount of time, as set by a user or by the default specifications of the code used to operate the replay debugger. In one or more examples, the user of the replay debugger can manually constrain which messages they wish to be recorded. For instance, in a multi-component distributed computing system, the user of the replay debugger may desire to only review the messages associated with a subset of the components in the distributed computing system. Thus in or more examples, the user of the replay can be provided with a graphical user interface that can allow for them to manually select which components of the distributed system should have their messages recorded during step 308.

Once the messages have been recorded at step 308, the process 300 can move to step 310 wherein the messages are aggregated and written into the log file. Aggregation can refer to the process of organizing the generated messages into a single log file, or in some examples can also refer to the process of combining multiple log files into a single file that can be ingested by the replay debugger.

Once the recorded messages have been aggregated and written into the generated log file at step 310, the process 300 can move to step 312 wherein the replay debugger can check to see if execution of the simulation has been completed. Completion of the execution of the simulation can either occur when a pre-determined amount of time has expired since the execution was started at step 302, or in some examples can end when the end of the program itself is encountered during execution. If the execution of the simulation is determined to have been completed, the process can move to step 314 wherein the process 300 is terminated. In one or more examples, terminating the process at 314 can include storing the generated log files in memory and uploading them to the computer or computing resources on which the replay debugger resides. If execution is still on-going, the process 300 can move back to step 304 wherein a new log file is generated and the process starts over.

Upon the completion of the process 300, the replay debugger can now have one or more log files associated with the execution of the distributed software program under inspection that provides information to the user regarding the messages generated during execution of the program. The information can be organized to facilitate operation of the graphical user interface (described below). In one or more examples, after the completion of process 300, the multiple log files generated can be aggregated into a single log file that can be used by the graphical user interface to provide a visual representation of the execution of the distributed software program to the user.

Figure 4:
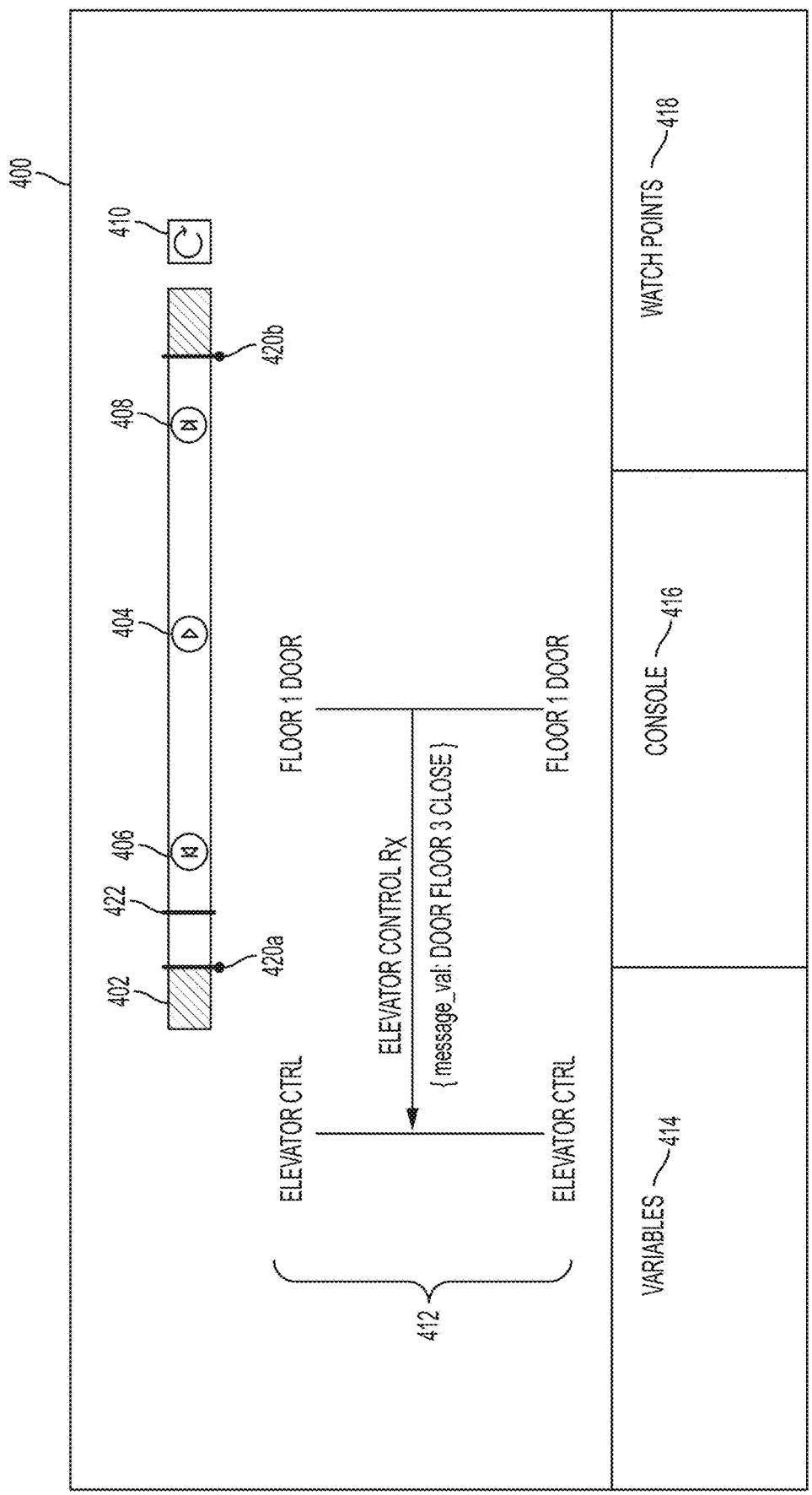
FIG. 4 illustrates an exemplary graphical user interface for a replay debugger according to examples of the disclosure.

FIG. 4 illustrates an exemplary graphical user interface for a replay debugger according to examples of the disclosure. The graphical user interface can be part of a replay debugging software suite that can be made available to a software developer. The replay debugger can be accessed via a cloud server in one or more examples, or can be stored locally on the machine of the software developer. In one or more examples, putting the replay debugger in a cloud server can facilitate multiple people sharing their logs and files generated during the execution of a particular portion of distributed software and can facilitate collaboration between multiple developers. In the example of a cloud based system in which multiple users are able to access a common replay debugger, the replay debugger can configured with a log in system to verify the credentials of an individual seeking access to the replay debugger. The log in system can also be used to identify which user has uploaded a log file to the system, and can be used to identify which individual account each log file stored in the system belongs to.

As described above, the graphical user interface can be configured to provide the user a way to visualize the progress of the execution of a distributed software program using log files generated by the process described by the discussion with respect to FIG. 3. The log files can be either manually uploaded to the replay debugging tool, or in one or more embodiments can be generated by the replay debugging tool when the tool is operating in a real-time mode (discussed further below).

The graphical user interface 400 can include a visual progress bar 402 that can support visualizing progress of the replay debugging process by a user of the replay debugger. The visual progress bar 402 can represent a timeline that can be manipulated by the user. The left side of the progress bar 402 can represent the beginning (in time) of the log file, and the right side of the progress bar 402 can represent the end (in time) of the log file.

Graphical user interface 400 can also include a visual representation of the messages being generated at a specific time by the components within a distributed system as represented within the log file. The visual representation 412 can illustrate the exact messages that are being sent at a particular moment in time correlated with the progress bar 402. Thus, if user clicks on the beginning of the visual progress bar 402, the log entries associated with the beginning of the visual progress bar 402, visual representation 412 can illustrate the messages generated at the beginning of the recording period. If the user clicks on the end of visual progress bar 402, the log entries associated with the end of the recording period can be illustrated at visual representation 412.

Visual representation 412 can illustrate the log entries by illustrating where the message originated (i.e., which computing element sent the message), where the message was sent, and can visually represent the contents of those messages. Using the example of the elevator provided in FIG. 2, and as illustrated in FIG. 4, at the instance of time shown (i.e., simulation time=20 seconds), visual representation 412 can illustrate that the Elevator controller element received a message from the 1$^{st}$ floor door component. Also as illustrated in FIG. 4, visual representation 412 can include information about the contents of the message. In the example illustrated, visual representation 412 shows that the elevator controller received from the 1$^{st}$ floor door, a message indicating that the 3$^{rd}$ floor door was closed.

The progress bar 402 can include a play button 404. The play button 404 can allow the user of the replay debugger to allow the recording to play and can also allow the replay debugger to pause the recording. When the recording (i.e., the log file) is allowed to play, visual representation 412 can dynamically change to match the status of the message occurring at the precise time in the play back of the logs. Thus, as the log file is being played back by the play button 404, the visual representation is changing based on the messages appearing in the log file at a given time.

The visual progress bar 402 can also include a progress indicator 422. Progress indicator 422 can provide a visual representation to the user of the graphical user interface 400 of point in time of the execution of the distributed software that is currently being displayed on the screen. In one or more examples, the further right along the visual progress bar 402 that progress indicator 422 is located, the further in time the replay has progressed.

The visual progress bar 402 can also include a step forward button 408. The step forward button can allow the user of the replay debugging tool to "step through" the log file playback one log file at a time. Thus, when step forward button 408 is pressed by the user (via a mouse click in one example) the playback can advance to the next log file in time. Upon pressing the step forward button 408, the visual representation 412 can change to match the messages associated with the next log file in time.

The visual progress bar 402 can also include, in one or more examples, a step back button 406. The step back button 406 can allow the user of the replay debugging tool to "step back" through the log file playback one log file at a time. Thus, when step back button 406 is pressed by the user (via a mouse click in one example) the playback can go back to the previous log in time. Upon pressing the step back button 406, the visual representation 412 can change to match the messages associated with the previous log file in time.

The graphical user interface 400 can include sliders 420a and 420b. Sliders 420a and 420b can be used by a user to limit the scope of the replay so that rather than replaying the entire execution of the distributed software program, the user can instead choose to only replay a portion of the execution. In one or more examples a user of the graphical user interface 400 can click on slider 420a and 420b and slide and place them along the visual progress bar 402. As an example, slider 420a can be used by the user of the graphical user interface 400 to indicate their preference of where the replay should begin. In one example, if the slider 420a is placed at the very left end of the visual progress bar 402 then the replay can begin at the very beginning of the execution of the distributed software program. However, if slider 420a is placed further to the right along visual progress bar 402, the replay can begin at a time later than the beginning of the execution. For example, the further right the slider 402a is placed along the visual progress bar 402, the later the replay of the distributed software program can begin. In other words the position of slider 420a can be proportional to the point in time at which the replay of the distributed software program is to be started.

Slider 420b can be used by the user of the graphical user interface 400 to indicate their preference of where the replay should end. In one example, if the slider 420b is placed at the very right end of the visual progress bar 402, then the replay can end at the very end of the execution of the distributed software program. However, if the slider 420b is placed further to the left along visual progress bar 402, the replay can terminate at a time earlier than the end of the execution of the distributed software program. For example, the further left the slider 402b is placed along the visual progress bar 402, the earlier the replay of the distributed software program can terminate. In other words the position of slider 420b can be proportional to the point in time at which the replay of the distributed software program is to be terminated.

The graphical user interface 400 can also include a replay button 410. Replay button 410, when clicked by the user can automatically begin the replay of the distributed software program at the point in time indicated by the position of slider 420a (i.e., the beginning of the time period). In the example, where slider 420a is to the far left end of the visual progress bar 402, if replay button 410 is clicked, the replay can start over at the beginning of the execution of the distributed software program. In the example where slider 420a is positioned at a point within the visual progress bar 402, when the user clicks on replay button 410, the replay can begin at the point in time of the replay indicated by slider 420a.

Also, as illustrated in FIG. 4, the graphical user interface 400 can also include a variables section 414, a console section 416, and a watch points section interface. The variables section 414 (described in further detail below) can indicate the status of various variables contained with the messages that make up the individual log files. The console section 416 can provide a space for a user to input various commands to the replay debugger tool. Watch point section interface can allow the user to visualize various watch points that have been inserted into the playback of the log files (discussed in further detail below).

Figure 5:
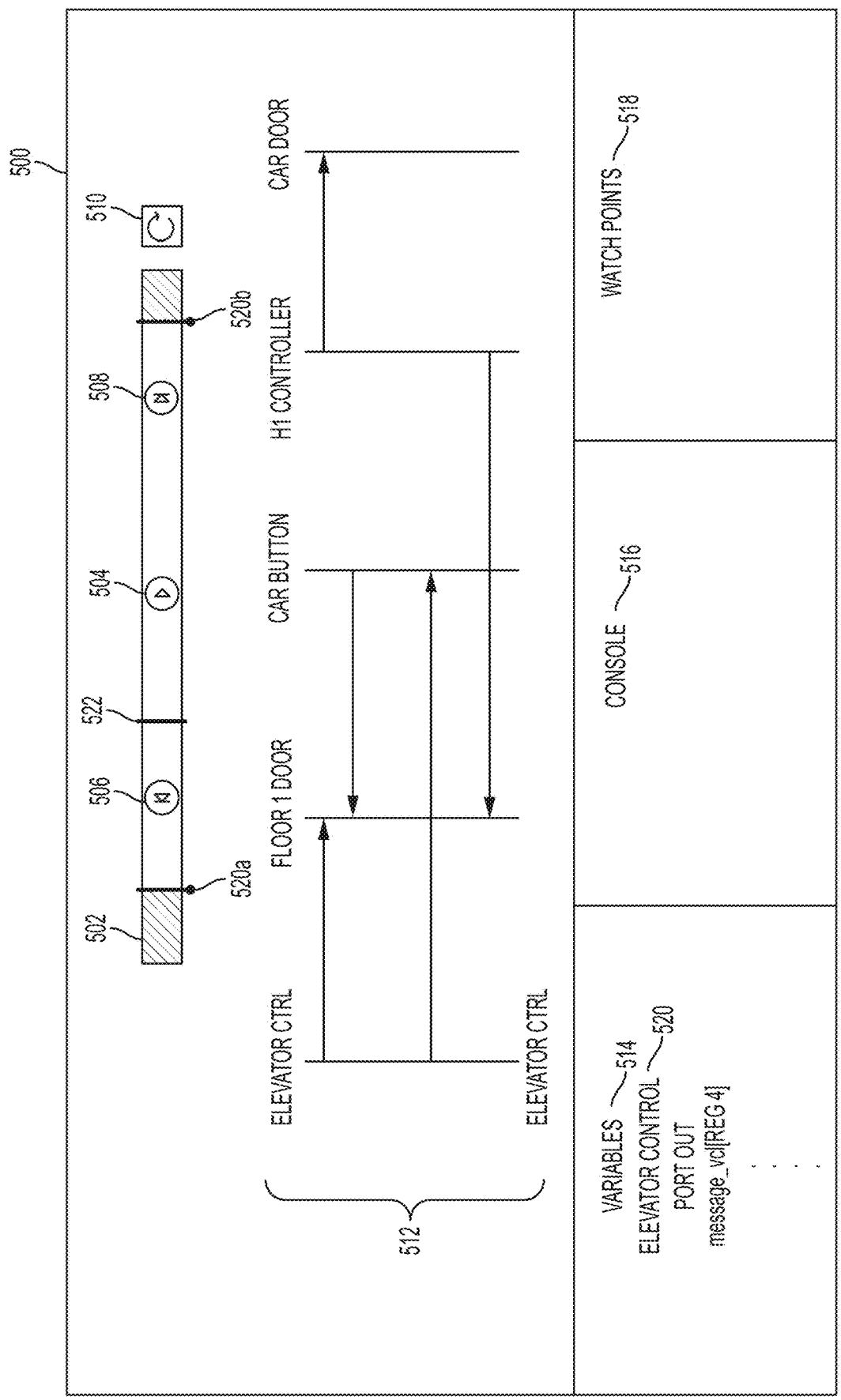
FIG. 5 illustrates an exemplary operation of the variables visualization portion of the replay debugger graphical user interface according to examples of the disclosure.

FIG. 5 illustrates an exemplary operation of the variables visualization portion of the replay debugger graphical user interface according to examples of the disclosure. The graphical user interface 500 of the example of FIG. 5 can operate in substantially the same manner as the example described with respect to FIG. 4. Therefore, for a detailed discussion of the components of the graphical user interface 500 (i.e., elements 502, 504, 506, 508, 510, 512, 514, 516, and 518) the discussion of their counterparts from FIG. 4 (i.e., elements 402, 404, 406, 408, 410, 412, 414, 416, and interface) can be referenced.

The example of FIG. 5 illustrates the operation of the variables section 514. The variables section 514 can illustrate the state of the variables at each moment of time during the playback of the log file. In other words, variables section 514 can provide a summary of the status of the various variables being sent back and forth between the components of the distributed computing system. In the example of FIG. 5, variables section 514 is illustrated as showing that at the particular moment in the playback the elevator control is transmitting from the out port and has received message "Req 4." The variables section 514 can list each and every component visualized in visualization section 512 and the variables passed in the messages between the components.

In one or more examples, one or more components listed in the variables section 514 can be labeled with a dot 520. The dot 520 can indicate that the component experienced a change to one or more variables as a result of a message passed to the component during the particular moment in the log playback being visualized. This feature can be utilized as part of the debugging process. As an example if the distributed software program under inspection exhibits a bug or crashes at a particular moment during the playback of the log files, the variables section 514 can be inspected to see which variables changed in that moment of time and thus the variables section 514 can be used to help a software developer ascertain the source of a failure of glitch.

In another example, the variables section 514 can be used to detect the presence of malicious users or activity during the operation of the distributed software program under inspection. As an example, if an unexplained change in the variable occurs as indicated by the variables section 514, then the software developer can be alerted to the possibility that the variable change was caused by an unauthorized and/or malicious user who is manipulating the messages between the individual components of the distributed computing system that is executing the distributed software program under inspection. In this way, while the visualization section 512 allows a user to see the activity occurring between components, the variables section can allow the user of the replay debugger to visualize the substantive changes to variables occurring during the visualized activity.

Returning to the example of FIG. 4, the graphical user interface 400 can include a watch points interface. A "watch point" can refer to a programmatic constraint wherein the replay debugger analyzes the one or more log files associated with a distributed software program to determine if a pre-defined condition is true.

Figure 6:
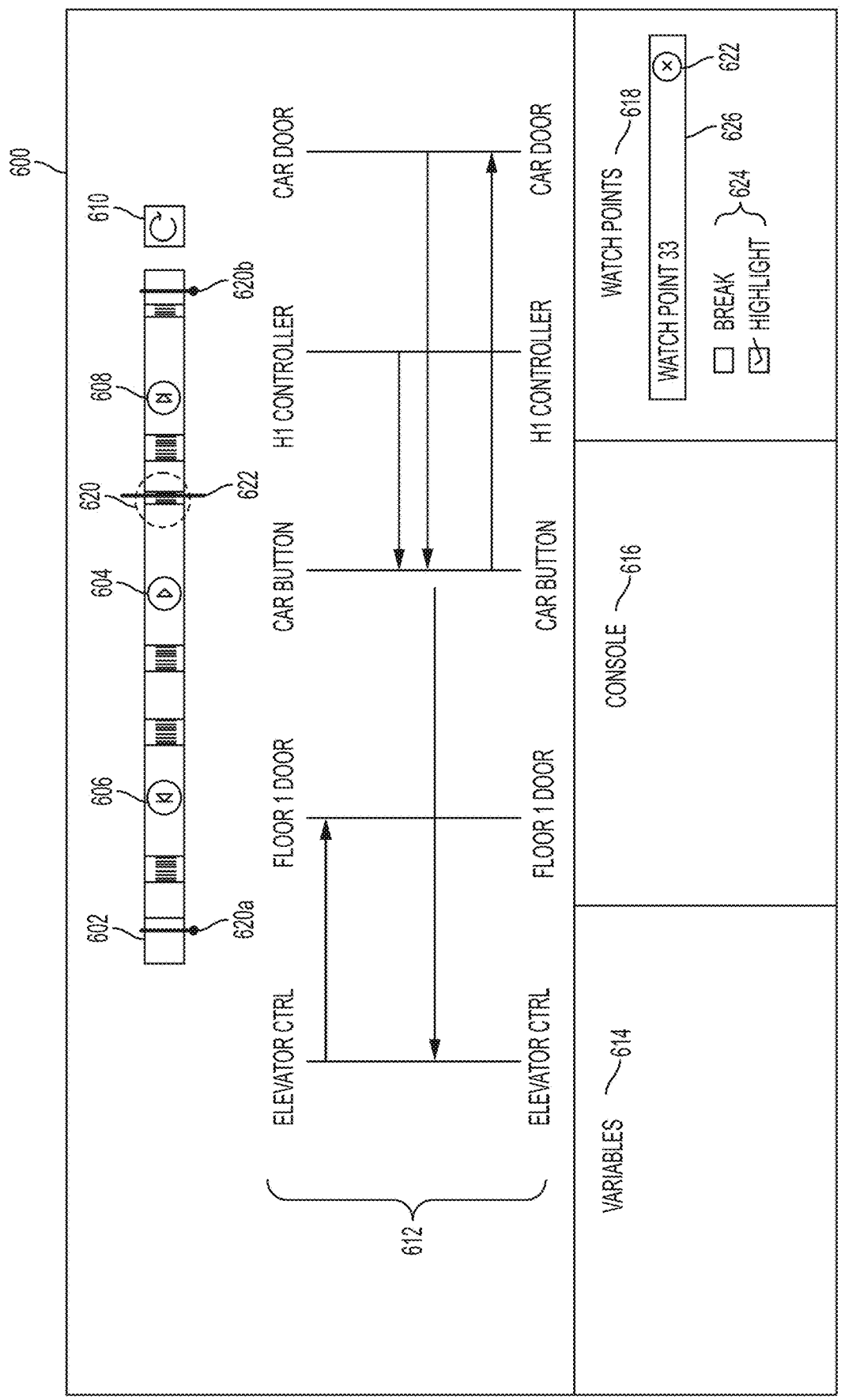

FIG. 6 illustrates an exemplary replay debugger graphical user interface with watch point detection capability according to examples of the disclosure. The graphical user interface 600 of the example of FIG. 6 can operate in substantially the same manner as the example described with respect to FIG. 4. Therefore, for a detailed discussion of the components of the graphical user interface 600 (i.e., elements 602, 604, 606, 608, 610, 612, 614, 616, and 618) the discussion of their counterparts from FIG. 4 (i.e., elements 402, 404, 406, 408, 410, 412, 414, 416, and interface) can be referenced.

In the example of FIG. 6, a user of the replay debugger can create and apply one or more watch points to the play back of the log files associated with execution of a distributed software program. As described above, a watch point can refer to a programmatic condition that the replay debugger can search for in a log file. A user can set up the watch point, and the replay debugger can scan the log file or files associated with the distributed software program under inspection to determine when the programmatic condition set by the user is true.

As an example, the user may want may want to know when a particular variable associated with the log file is greater than or less than a pre-defined value. In another example, the user may want to know when one variable associated with the log file is greater than or less than another variable associated with the log file. In any of the above examples, the user can user a graphical user interface (not pictured) to create their desired watch points.

Watch points interface 618 can provide a graphical user interface within the graphical user interface 600 to manage watch points created by the user. As illustrated, each watch point created by the user can be identified with a tag 626 that can identify the watch point's name (in the example, the watch point is titled "Watch point 33"). In one or more examples the tag 626 can include an icon 622 that when manipulated by the user (i.e., clicked on via mouse as an example) can delete the watch point.

In this way, watch points interface 618 can provide the user of a replay debugger a convenient and efficient means to manage all of the watch points that have been programmed into the play back of the distributed software program under inspection by the replay debugger.

In one or more examples of the disclosure, each watch point tag 626 can include a menu 612 that is provides users with additional options with respect to the watch point associated with the tag 626. In one example, and as depicted in FIG. 6, the menu 612 can provide the user the option of whether they want to highlight when the watch point is true on the visual progress bar 602, or provide a break to the replay when the watch point is true.

When the highlight option of menu 624 is selected by the user, the replay debugger can highlight the portions in time in which the watch point condition is true on the visual progress bar 602. As illustrated in the example of FIG. 6, the visual progress bar 602 includes multiple highlighted portions 620. In one or more examples, the highlighted portions 620 can represent time periods during the replay of the log file in which the condition corresponding to the watch point is true.

When the break option of menu 624 is selected, the replay debugger can automatically break (i.e., stop the replay of the log file) when the condition set by the watch point is true. For instance if a watch point is set to trigger when a variable is above a pre-determined value, when the log file is played (by engaging play button 604) the replay will continuously play until the moment the watch point become true. At the moment when the watch point condition becomes true, the replay can "break" meaning temporarily pause, until the user hits play again. In this way, the user can analyze the state of the log file at the precise moment or moments when the pre-defined condition of watch point occurs.

In one or more examples, the replay debugger can also include a real-time playback capability. As described with respect to FIG. 2, in one or more examples, the distributed software program under inspection can be first executed and then have the generated log files aggregated which can be then uploaded to the replay debugger. In one or more examples of the disclosure, the user can operate the graphical user interface 400 in a real-time mode. When the graphical user interface 400 is operated in real-time mode, one the user pushes the play button 404, the distributed software program under inspection is executed, and the log files generated are shown in real-time (i.e., as they are being generated). If the user pauses the replay or goes back, then the replay debugger can revert to its "replay mode" in which the log files displayed in the graphical user interface are shown after they have been generated.

The graphical user interface described above with respect to FIGS. 4, 5, and 6 can facilitate efficient replay debugging by providing the user a convenient and intuitive way to visualize what the distributed software program under inspection is doing at any given time during its operation.

Figure 7:
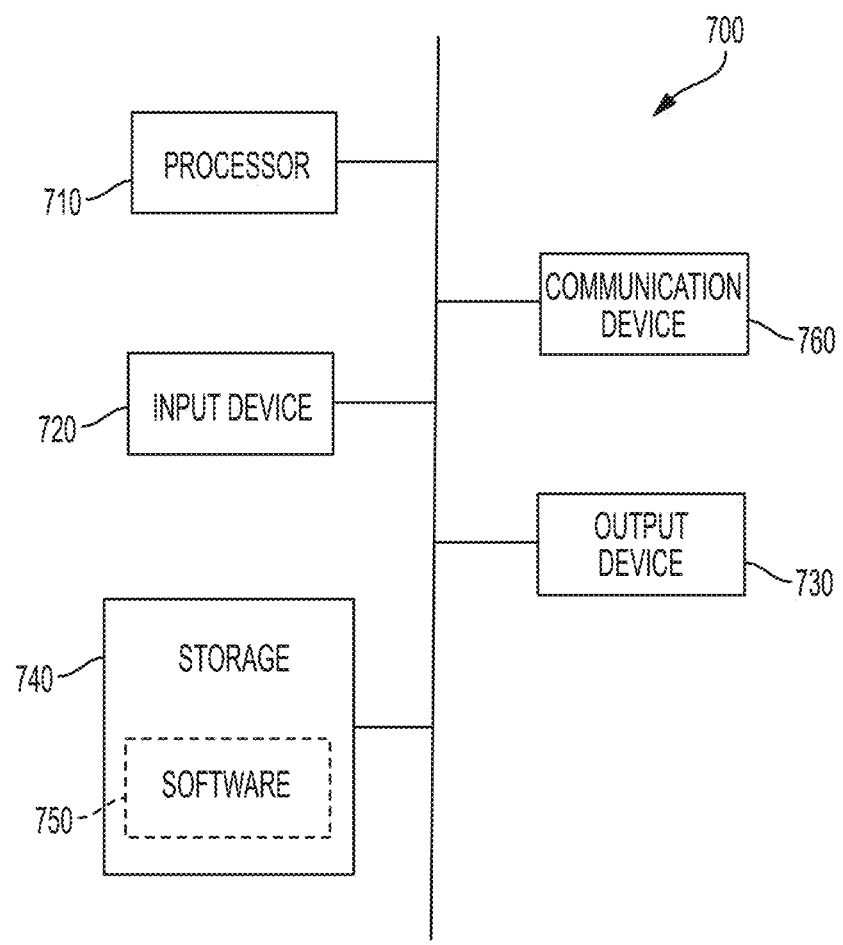
FIG. 7 illustrates an example of a computing device in accordance with one embodiment.

FIG. 7 illustrates an example of a computing device in accordance with one embodiment. Device 700 can be a host computer connected to a network. Device 700 can be a client computer or a server. As shown in FIG. 7, device 700 can be any suitable type of microprocessor-based device, such as a personal computer, workstation, server or handheld computing device (portable electronic device) such as a phone or tablet. The device can include, for example, one or more of processor 710, input device 720, output device 730, storage 740, and communication device 760. Input device 720 and output device 730 can generally correspond to those described above, and can either be connectable or integrated with the computer.

Input device 720 can be any suitable device that provides input, such as a touch screen, keyboard or keypad, mouse, or voice-recognition device. Output device 730 can be any suitable device that provides output, such as a touch screen, haptics device, or speaker.

Storage 740 can be any suitable device that provides storage, such as an electrical, magnetic or optical memory including a RAM, cache, hard drive, or removable storage disk. Communication device 760 can include any suitable device capable of transmitting and receiving signals over a network, such as a network interface chip or device. The components of the computer can be connected in any suitable manner, such as via a physical bus or wirelessly.

Software 750, which can be stored in storage 740 and executed by processor 710, can include, for example, the programming that embodies the functionality of the present disclosure (e.g., as embodied in the devices as described above).

Software 750 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 700 can implement any operating system suitable for operating on the network. Software 750 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Therefore, according to the above, some examples of the disclosure are directed to a method comprising: at an electronic device with a display and an interface configured to accept one or more inputs from a user of the electronic device: receiving one or more log files, wherein the one or more log files are based on a plurality of messages generated by a plurality of components in a distributed computing system during an execution of a distributed software program implemented on the plurality of components, and wherein each log file of the one or more log files includes a time stamp, displaying a visual progress bar on the display in a predefined area of the display, wherein the visual progress bar includes a first end and a second end, wherein the first end of the visual progress bar corresponds to the log file with the earliest time stamp of the one or more log files and the second end corresponds to the log file with the latest timestamp of the one or more log files, displaying a progress indicator on the visual progress bar, wherein a position of the progress indicator on the visual progress bar corresponds to a log file of the one or more log files, displaying a visual representation in a predefined area of the display, wherein the visual representation corresponds to a content of the log file corresponding to the position of the progress indicator, and wherein in response to a first input from the user at the interface, the position of the progress indicator moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and wherein in response to a second input from the user at the interface, the progress indicator stops moving. Additionally or alternatively to one or more examples disclosed above, the method further comprises: displaying a play button in a predefined area of the display, wherein the first and second inputs from the user include clicking on the displayed play button. Additionally or alternatively to one or more examples disclosed above, the displayed visual representation is based on or more messages contained within the log file that corresponds to the position of the progress indicator. Additionally or alternatively to one or more examples disclosed above, the method includes displaying a list in a predefined area of the display, wherein each log file of the one or more log files include one or more variables, and wherein the list includes a listing of the one or more variables included in the log file corresponding to the position of the progress indicator. Additionally or alternatively to one or more examples disclosed above, displaying the list includes displaying a first list corresponding to a first log file wherein the first list includes a first variable with a first value, displaying a second list corresponding to a second log file wherein the second list includes the first variable with a second value, and providing a visual indication when the first value and the second value are different with respect to each other. Additionally or alternatively to one or more examples disclosed above, the method further includes displaying a list in a predefined area of the display, wherein the list includes one or more user-defined watch points, wherein each watch point of the one or more watch points includes a pre-determined condition and wherein each log file of the one or more log files is analyzed to determine whether a content of the log file satisfies each pre-defined condition. Additionally or alternatively to one or more examples disclosed above, the method further includes providing a visual indication on the visual progress bar when a log file of the one or more log files satisfies the one or more pre-defined conditions of the one or more watch points. Additionally or alternatively to one or more examples disclosed above, the method further includes displaying a step forward button in a predefined area of the display, wherein the step forward button when manipulated by the user causes the position of the progress indicator on the visual progress bar to move from a first position corresponding to a first log file to a second position corresponding to a second log file, wherein the time stamp of the second log file is later in time than the time stamp of the first log file. Additionally or alternatively to one or more examples disclosed above, the method further includes displaying a step back button in a predefined area of the display, wherein the step back button when manipulated by the user causes the position of the progress indicator on the visual progress bar to move from a first position corresponding to a first log file to a second position corresponding to a second log file, wherein the time stamp of the second log file is earlier in time than the time stamp of the first log file. Additionally or alternatively to one or more examples disclosed above, the method further includes displaying a first slider on the visual progress bar, wherein a position of the first slider is configured to be manipulated by the user of the graphical user interface, and wherein the position of the first slider corresponds to a first log file of the one more log files, displaying a second slider on the visual progress bar, wherein a position of the second slider is configured to be manipulated by the user of the graphical user interface, and wherein the position of the second slider corresponds to a second log file of the one more log files, wherein in response to the first input from the user at the interface, the position of the progress indicator begins at the position of the first slider and moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and when the position of the progress indicator is the same as the position of the second slider, the replay is stopped.

Other examples of the disclosure are directed to a computing system, the computing system comprising: a display, a user interface configured to receive inputs from a user of the system, a memory, one or more processors, and one or more programs, wherein the one or more programs are stored in the memory and configured to be executed by the one or more processors, the one or more programs when executed by the one or more processors cause the processor to: receive one or more log files, wherein the one or more log files are based on a plurality of messages generated by a plurality of components in a distributed computing system during an execution of a distributed software program implemented on the plurality of components, and wherein each log file of the one or more log files includes a time stamp, display a visual progress bar on the display in a predefined area of the display, wherein the visual progress bar includes a first end and a second end, wherein the first end of the visual progress bar corresponds to the log file with the earliest time stamp of the one or more log files and the second end corresponds to the log file with the latest timestamp of the one or more log files, display a progress indicator on the visual progress bar, wherein a position of the progress indicator on the visual progress bar corresponds to a log file of the one or more log files, display a visual representation in a predefined area of the display, wherein the visual representation corresponds to a content of the log file corresponding to the position of the progress indicator, and wherein in response to a first input from the user at the interface, the position of the progress indicator moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and wherein in response to a second input from the user at the interface, the progress indicator stops moving. Additionally or alternatively to one or more examples disclosed above, the processor is further configured to: display a play button in a predefined area of the display, wherein the first and second inputs from the user include clicking on the displayed play button. Additionally or alternatively to one or more examples disclosed above, the displayed visual representation is based on or more messages contained within the log file that corresponds to the position of the progress indicator. Additionally or alternatively to one or more examples disclosed above, the processor is further configured to display a list in a predefined area of the display, wherein each log file of the one or more log files include one or more variables, and wherein the list includes a listing of the one or more variables included in the log file corresponding to the position of the progress indicator. Additionally or alternatively to one or more examples disclosed above, displaying the list includes displaying a first list corresponding to a first log file wherein the first list includes a first variable with a first value, displaying a second list corresponding to a second log file wherein the second list includes the first variable with a second value, and providing a visual indication when the first value and the second value are different with respect to each other. Additionally or alternatively to one or more examples disclosed above, the processor is further configured to display a list in a predefined area of the display, wherein the list includes one or more user-defined watch points, wherein each watch point of the one or more watch points includes a pre-determined condition and wherein each log file of the one or more log files is analyzed to determine whether a content of the log file satisfies each pre-defined condition. Additionally or alternatively to one or more examples disclosed above, the processor is further configured to provide a visual indication on the visual progress bar when a log file of the one or more log files satisfies the one or more pre-defined conditions of the one or more watch points. Additionally or alternatively to one or more examples disclosed above, the processor is further configured to display a step forward button in a predefined area of the display, wherein the step forward button when manipulated by the user causes the position of the progress indicator on the visual progress bar to move from a first position corresponding to a first log file to a second position corresponding to a second log file, wherein the time stamp of the second log file is later in time than the time stamp of the first log file. Additionally or alternatively to one or more examples disclosed above, the processor is further configured to display a step back button in a predefined area of the display, wherein the step back button when manipulated by the user causes the position of the progress indicator on the visual progress bar to move from a first position corresponding to a first log file to a second position corresponding to a second log file, wherein the time stamp of the second log file is earlier in time than the time stamp of the first log file. Additionally or alternatively to one or more examples disclosed above, t the processor is further configured to display a first slider on the visual progress bar, wherein a position of the first slider is configured to be manipulated by the user of the graphical user interface, and wherein the position of the first slider corresponds to a first log file of the one more log files, display a second slider on the visual progress bar, wherein a position of the second slider is configured to be manipulated by the user of the graphical user interface, and wherein the position of the second slider corresponds to a second log file of the one more log files, wherein in response to the first input from the user at the interface, the position of the progress indicator begins at the position of the first slider and moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and when the position of the progress indicator is the same as the position of the second slider, the replay is stopped.

Other examples of the disclosure are directed to a computer readable storage medium storing one or more programs, the one or more programs comprising instructions, which when executed by an electronic device with a display and a user input interface, cause the device to: receive one or more log files, wherein the one or more log files are based on a plurality of messages generated by a plurality of components in a distributed computing system during an execution of a distributed software program implemented on the plurality of components, and wherein each log file of the one or more log files includes a time stamp, display a visual progress bar on the display in a predefined area of the display, wherein the visual progress bar includes a first end and a second end, wherein the first end of the visual progress bar corresponds to the log file with the earliest time stamp of the one or more log files and the second end corresponds to the log file with the latest timestamp of the one or more log files, display a progress indicator on the visual progress bar, wherein a position of the progress indicator on the visual progress bar corresponds to a log file of the one or more log files, display a visual representation in a predefined area of the display, wherein the visual representation corresponds to a content of the log file corresponding to the position of the progress indicator; and wherein in response to a first input from the user at the interface, the position of the progress indicator moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and wherein in response to a second input from the user at the interface, the progress indicator stops moving. Additionally or alternatively to one or more examples disclosed above, the device is further configured to: display a play button in a predefined area of the display, wherein the first and second inputs from the user include clicking on the displayed play button. Additionally or alternatively to one or more examples disclosed above, the displayed visual representation is based on or more messages contained within the log file that corresponds to the position of the progress indicator. Additionally or alternatively to one or more examples disclosed above, the device is further configured to display a list in a predefined area of the display, wherein each log file of the one or more log files include one or more variables, and wherein the list includes a listing of the one or more variables included in the log file corresponding to the position of the progress indicator. Additionally or alternatively to one or more examples disclosed above, displaying the list includes displaying a first list corresponding to a first log file wherein the first list includes a first variable with a first value, displaying a second list corresponding to a second log file wherein the second list includes the first variable with a second value, and providing a visual indication when the first value and the second value are different with respect to each other. Additionally or alternatively to one or more examples disclosed above, the device is further configured to display a list in a predefined area of the display, wherein the list includes one or more user-defined watch points, wherein each watch point of the one or more watch points includes a pre-determined condition and wherein each log file of the one or more log files is analyzed to determine whether a content of the log file satisfies each pre-defined condition. Additionally or alternatively to one or more examples disclosed above, the device is further configured to provide a visual indication on the visual progress bar when a log file of the one or more log files satisfies the one or more pre-defined conditions of the one or more watch points. Additionally or alternatively to one or more examples disclosed above, the device is further configured to display a step forward button in a predefined area of the display, wherein the step forward button when manipulated by the user causes the position of the progress indicator on the visual progress bar to move from a first position corresponding to a first log file to a second position corresponding to a second log file, wherein the time stamp of the second log file is later in time than the time stamp of the first log file. Additionally or alternatively to one or more examples disclosed above, the device is further configured to display a step back button in a predefined area of the display, wherein the step back button when manipulated by the user causes the position of the progress indicator on the visual progress bar to move from a first position corresponding to a first log file to a second position corresponding to a second log file, wherein the time stamp of the second log file is earlier in time than the time stamp of the first log file. Additionally or alternatively to one or more examples disclosed above, t the device is further configured to display a first slider on the visual progress bar, wherein a position of the first slider is configured to be manipulated by the user of the graphical user interface, and wherein the position of the first slider corresponds to a first log file of the one more log files, display a second slider on the visual progress bar, wherein a position of the second slider is configured to be manipulated by the user of the graphical user interface, and wherein the position of the second slider corresponds to a second log file of the one more log files, wherein in response to the first input from the user at the interface, the position of the progress indicator begins at the position of the first slider and moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and when the position of the progress indicator is the same as the position of the second slider, the replay is stopped.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A method, comprising:
   at an electronic device with a display and an interface configured to accept one or more inputs from a user of the electronic device:
   receiving one or more log files, wherein the one or more log files are based on a plurality of messages generated by a plurality of components in a distributed computing system during an execution of a distributed software program implemented on the plurality of components, and wherein each log file of the one or more log files includes a time stamp;
   displaying a visual progress bar on the display in a predefined area of the display, wherein the visual progress bar includes a first end and a second end, wherein the first end of the visual progress bar corresponds to the log file with the earliest time stamp of the one or more log files and the second end corresponds to the log file with the latest timestamp of the one or more log files;
   displaying a progress indicator on the visual progress bar, wherein a position of the progress indicator on the visual progress bar corresponds to a log file of the one or more log files;
   displaying a visual representation in a predefined area of the display, wherein the visual representation corresponds to a content of the log file corresponding to the position of the progress indicator; and
   wherein in response to a first input from the user at the interface, the position of the progress indicator moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and wherein in response to a second input from the user at the interface, the progress indicator stops moving.

2. The method of claim 1, the method further comprising:
   displaying a play button in a predefined area of the display, wherein the first and second inputs from the user include clicking on the displayed play button.

3. The method of claim 1, wherein the displayed visual representation is based on or more messages contained within the log file that corresponds to the position of the progress indicator.

4. The method of claim 1, the method further comprising:
   displaying a list in a predefined area of the display, wherein each log file of the one or more log files include one or more variables, and wherein the list includes a listing of the one or more variables included in the log file corresponding to the position of the progress indicator.

5. The method of claim 4, wherein displaying the list includes displaying a first list corresponding to a first log file wherein the first list includes a first variable with a first value, displaying a second list corresponding to a second log file wherein the second list includes the first variable with a second value, and providing a visual indication when the first value and the second value are different with respect to each other.

6. The method of claim 1, the method further comprising:
   displaying a list in a predefined area of the display, wherein the list includes one or more user-defined watch points, wherein each watch point of the one or more watch points includes a pre-determined condition and wherein each log file of the one or more log files is analyzed to determine whether a content of the log file satisfies each pre-defined condition.

7. The method of claim 6, the method further comprising providing a visual indication on the visual progress bar when a log file of the one or more log files satisfies the one or more pre-defined conditions of the one or more watch points.

8. The method of claim 1, the method further comprising:
   displaying a step forward button in a predefined area of the display, wherein the step forward button when manipulated by the user causes the position of the progress indicator on the visual progress bar to move from a first position corresponding to a first log file to a second position corresponding to a second log file, wherein the time stamp of the second log file is later in time than the time stamp of the first log file.

9. The method of claim 1, the method further comprising:
   displaying a step back button in a predefined area of the display, wherein the step back button when manipulated by the user causes the position of the progress indicator on the visual progress bar to move from a first position corresponding to a first log file to a second position corresponding to a second log file, wherein the time stamp of the second log file is earlier in time than the time stamp of the first log file.

10. The method of claim 1, the method further comprising:
displaying a first slider on the visual progress bar, wherein a position of the first slider is configured to be manipulated by the user of the graphical user interface, and wherein the position of the first slider corresponds to a first log file of the one more log files;
displaying a second slider on the visual progress bar, wherein a position of the second slider is configured to be manipulated by the user of the graphical user interface, and wherein the position of the second slider corresponds to a second log file of the one more log files;
wherein in response to the first input from the user at the interface, the position of the progress indicator begins at the position of the first slider and moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and when the position of the progress indicator is the same as the position of the second slider, the progress indicator is stopped.

11. A computing system, comprising:
a display;
a user interface configured to receive inputs from a user of the system;
a memory;
one or more processors; and
one or more programs, wherein the one or more programs are stored in the memory and configured to be executed by the one or more processors, the one or more programs when executed by the one or more processors cause the processor to:
receive one or more log files, wherein the one or more log files are based on a plurality of messages generated by a plurality of components in a distributed computing system during an execution of a distributed software program implemented on the plurality of components, and wherein each log file of the one or more log files includes a time stamp;
display a visual progress bar on the display in a predefined area of the display, wherein the visual progress bar includes a first end and a second end, wherein the first end of the visual progress bar corresponds to the log file with the earliest time stamp of the one or more log files and the second end corresponds to the log file with the latest timestamp of the one or more log files;
display a progress indicator on the visual progress bar, wherein a position of the progress indicator on the visual progress bar corresponds to a log file of the one or more log files;
display a visual representation in a predefined area of the display, wherein the visual representation corresponds to a content of the log file corresponding to the position of the progress indicator; and
wherein in response to a first input from the user at the interface, the position of the progress indicator moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and wherein in response to a second input from the user at the interface, the progress indicator stops moving.

12. The system, of claim 11, wherein the processor is further caused to:
display a play button in a predefined area of the display, wherein the first and second inputs from the user include clicking on the displayed play button.

13. The system of claim 11, wherein the displayed visual representation is based on or more messages contained within the log file that corresponds to the position of the progress indicator.

14. The system of claim 11, wherein the processor is further caused to:
display a list in a predefined area of the display, wherein each log file of the one or more log files include one or more variables, and wherein the list includes a listing of the one or more variables included in the log file corresponding to the position of the progress indicator.

15. The system of claim 14, wherein displaying the list includes displaying a first list corresponding to a first log file wherein the first list includes a first variable with a first value, displaying a second list corresponding to a second log file wherein the second list includes the first variable with a second value, and providing a visual indication when the first value and the second value are different with respect to each other.

16. The system of claim 11, wherein the processor is further caused to:
display a list in a predefined area of the display, wherein the list includes one or more user-defined watch points, wherein each watch point of the one or more watch points includes a pre-determined condition and wherein each log file of the one or more log files is analyzed to determine whether a content of the log file satisfies each pre-defined condition.

17. The system of claim 16, wherein the processor is further caused to provide a visual indication on the visual progress bar when a log file of the one or more log files satisfies the one or more pre-defined conditions of the one or more watch points.

18. The system of claim 11, wherein the processor is further caused to:
display a step forward button in a predefined area of the display, wherein the step forward button when manipulated by the user causes the position of the progress indicator on the visual progress bar to move from a first position corresponding to a first log file to a second position corresponding to a second log file, wherein the time stamp of the second log file is later in time than the time stamp of the first log file.

19. The system of claim 11, wherein the processor is further caused to:
display a step back button in a predefined area of the display, wherein the step back button when manipulated by the user causes the position of the progress indicator on the visual progress bar to move from a first position corresponding to a first log file to a second position corresponding to a second log file, wherein the time stamp of the second log file is earlier in time than the time stamp of the first log file.

20. The system of claim 11, wherein the processor is further caused to:
    display a first slider on the visual progress bar, wherein a position of the first slider is configured to be manipulated by the user of the graphical user interface, and wherein the position of the first slider corresponds to a first log file of the one more log files;
    display a second slider on the visual progress bar, wherein a position of the second slider is configured to be manipulated by the user of the graphical user interface, and wherein the position of the second slider corresponds to a second log file of the one more log files;
    wherein in response to the first input from the user at the interface, the position of the progress indicator begins at the position of the first slider and moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and when the position of the progress indicator is the same as the position of the second slider, the progress indicator is stopped.

21. A computer readable storage medium storing one or more programs, the one or more programs comprising instructions, which when executed by an electronic device with a display and a user input interface, cause the device to:
    receive one or more log files, wherein the one or more log files are based on a plurality of messages generated by a plurality of components in a distributed computing system during an execution of a distributed software program implemented on the plurality of components, and wherein each log file of the one or more log files includes a time stamp;
    display a visual progress bar on the display in a predefined area of the display, wherein the visual progress bar includes a first end and a second end, wherein the first end of the visual progress bar corresponds to the log file with the earliest time stamp of the one or more log files and the second end corresponds to the log file with the latest timestamp of the one or more log files;
    display a progress indicator on the visual progress bar, wherein a position of the progress indicator on the visual progress bar corresponds to a log file of the one or more log files;
    display a visual representation in a predefined area of the display, wherein the visual representation corresponds to a content of the log file corresponding to the position of the progress indicator; and
    wherein in response to a first input from the user at the interface, the position of the progress indicator moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and wherein in response to a second input from the user at the interface, the progress indicator stops moving.

22. The computer readable storage medium of claim 21, wherein the device is further caused to:
    display a play button in a predefined area of the display, wherein the first and second inputs from the user include clicking on the displayed play button.

23. The computer readable storage medium of claim 22, wherein the displayed visual representation is based on or more messages contained within the log file that corresponds to the position of the progress indicator.

24. The computer readable storage medium of claim 21, wherein the device is further caused to:
    display a list in a predefined area of the display, wherein each log file of the one or more log files include one or more variables, and wherein the list includes a listing of the one or more variables included in the log file corresponding to the position of the progress indicator.

25. The computer readable storage medium of claim 24, wherein displaying the list includes displaying a first list corresponding to a first log file wherein the first list includes a first variable with a first value, displaying a second list corresponding to a second log file wherein the second list includes the first variable with a second value, and providing a visual indication when the first value and the second value are different with respect to each other.

26. The computer readable storage medium of claim 21, wherein the device is further caused to:
    display a list in a predefined area of the display, wherein the list includes one or more user-defined watch points, wherein each watch point of the one or more watch points includes a pre-determined condition and wherein each log file of the one or more log files is analyzed to determine whether a content of the log file satisfies each pre-defined condition.

27. The computer readable storage medium of claim 26, wherein the device is further caused to provide a visual indication on the visual progress bar when a log file of the one or more log files satisfies the one or more pre-defined conditions of the one or more watch points.

28. The computer readable storage medium of claim 21, wherein the device is further caused to:
    display a step forward button in a predefined area of the display, wherein the step forward button when manipulated by the user causes the position of the progress indicator on the visual progress bar to move from a first position corresponding to a first log file to a second position corresponding to a second log file, wherein the time stamp of the second log file is later in time than the time stamp of the first log file.

29. The computer readable storage medium of claim 21, wherein the device is further caused to:
    display a step back button in a predefined area of the display, wherein the step back button when manipulated by the user causes the position of the progress indicator on the visual progress bar to move from a first position corresponding to a first log file to a second position corresponding to a second log file, wherein the time stamp of the second log file is earlier in time than the time stamp of the first log file.

30. The computer readable storage medium of claim 21, wherein the device is further caused to:
    display a first slider on the visual progress bar, wherein a position of the first slider is configured to be manipulated by the user of the graphical user interface, and wherein the position of the first slider corresponds to a first log file of the one more log files;
    display a second slider on the visual progress bar, wherein a position of the second slider is configured to be manipulated by the user of the graphical user interface, and wherein the position of the second slider corresponds to a second log file of the one more log files;
    wherein in response to the first input from the user at the interface, the position of the progress indicator begins at the position of the first slider and moves in a direction from the first end of the visual progress bar to the second end of the visual progress bar, wherein the log file associated with the progress indicator changes when the position of the progress indicator changes, wherein the visual representation displayed changes when the log file corresponding to the progress indicator changes, and when the position of the progress indicator is the same as the position of the second slider, the progress indicator is stopped.

* * * * *